(12) United States Patent
Chang et al.

(10) Patent No.: US 10,166,707 B2
(45) Date of Patent: Jan. 1, 2019

(54) RFID DEVICE AND METHOD FOR MAKING THE SAME

(71) Applicant: Securitag Assembly Group Co., Ltd, Taichung (TW)

(72) Inventors: Cheng hung Chang, Taichung (TW); Ching Mei Chi, Taichung (TW); Chun Jun Chuang, Taichung (TW); Ya Chi Shen, Taichung (TW); Tian lin Yan, Taichung (TW)

(73) Assignee: SECURITAG ASSEMBLY GROUP CO., LTD, Taichung (TW)

( * ) Notice: Subject to any disclaimer, the term of this patent is extended or adjusted under 35 U.S.C. 154(b) by 0 days.

(21) Appl. No.: 15/847,848

(22) Filed: Dec. 19, 2017

(65) Prior Publication Data

US 2018/0169917 A1 Jun. 21, 2018

(30) Foreign Application Priority Data

Dec. 19, 2016 (TW) .............................. 105142043 A

(51) Int. Cl.
*G06K 19/07* (2006.01)
*B29C 45/16* (2006.01)
(Continued)

(52) U.S. Cl.
CPC .... *B29C 45/1671* (2013.01); *B29C 45/14819* (2013.01); *G06K 19/07724* (2013.01); *G06K 19/07749* (2013.01); *G06K 19/07773* (2013.01); *H01Q 13/16* (2013.01); *B29C 45/14311* (2013.01); *B29C 2045/1673* (2013.01); *B29C 2045/1692* (2013.01); *B29K 2077/00* (2013.01); *B29K 2105/12* (2013.01); *B29K 2509/08* (2013.01); *B29L 2031/3456* (2013.01); *B29L 2031/3481* (2013.01); *H01Q 1/2283* (2013.01)

(58) Field of Classification Search
CPC .......... B29C 45/1671; B29C 45/14819; G06K 19/07724; G06K 19/07749; G06K 19/07773; H01Q 13/16
USPC ........................................................ 235/492
See application file for complete search history.

(56) References Cited

U.S. PATENT DOCUMENTS 6,021,949 A 2/2000 Boiron
6,255,949 B1 7/2001 Nicholson et al.
(Continued)

FOREIGN PATENT DOCUMENTS

CN 101678233 A 3/2010
CN 203204669 U 9/2013
(Continued)

OTHER PUBLICATIONS

Taiwanese Office Action, dated May 24, 2017, in a counterpart Taiwanese patent application, No. TW 105142043.

*Primary Examiner* — Daniel A Hess
(74) *Attorney, Agent, or Firm* — Chen Yoshimura LLP

(57) ABSTRACT

The present invention provides an RFID device and manufacturing method. The RFID device comprises a first housing, an antenna module, and a second housing. The antenna module arranged on the first housing comprises a base substrate, and an antenna layer, sticking on an outer surface of the base substrate. The second housing is formed to couple to the first housing by an injection molding process so that the antenna module is arranged between the first and second housings.

14 Claims, 9 Drawing Sheets

(51) Int. Cl.
  *B29C 45/14* (2006.01)
  *G06K 19/077* (2006.01)
  *H01Q 13/16* (2006.01)
  *H01Q 1/22* (2006.01)
  *B29K 77/00* (2006.01)
  *B29K 509/08* (2006.01)
  *B29L 31/34* (2006.01)
  *B29K 105/12* (2006.01)

(56) References Cited

U.S. PATENT DOCUMENTS

| | | |
|---|---|---|
| 8,068,010 B2 | 11/2011 | Bauchot et al. |
| 8,251,295 B2 | 8/2012 | Ritamaki et al. |
| 8,325,047 B2 | 12/2012 | Marur et al. |
| 9,269,039 B2 | 2/2016 | Sakanashi |
| 2006/0160628 A1 | 7/2006 | Abe |
| 2010/0079238 A1 | 4/2010 | Gravelle et al. |
| 2010/0105486 A1 | 4/2010 | Shigeta |
| 2013/0021215 A1* | 1/2013 | Suzuki .................. B29C 45/14 343/787 |
| 2014/0332597 A1 | 11/2014 | Gelinotte et al. |

FOREIGN PATENT DOCUMENTS

| | | |
|---|---|---|
| CN | 204143485 U | 2/2015 |
| CN | 205427899 U | 8/2016 |
| TW | M393745 | 12/2010 |
| TW | 201208918 A | 3/2012 |

\* cited by examiner

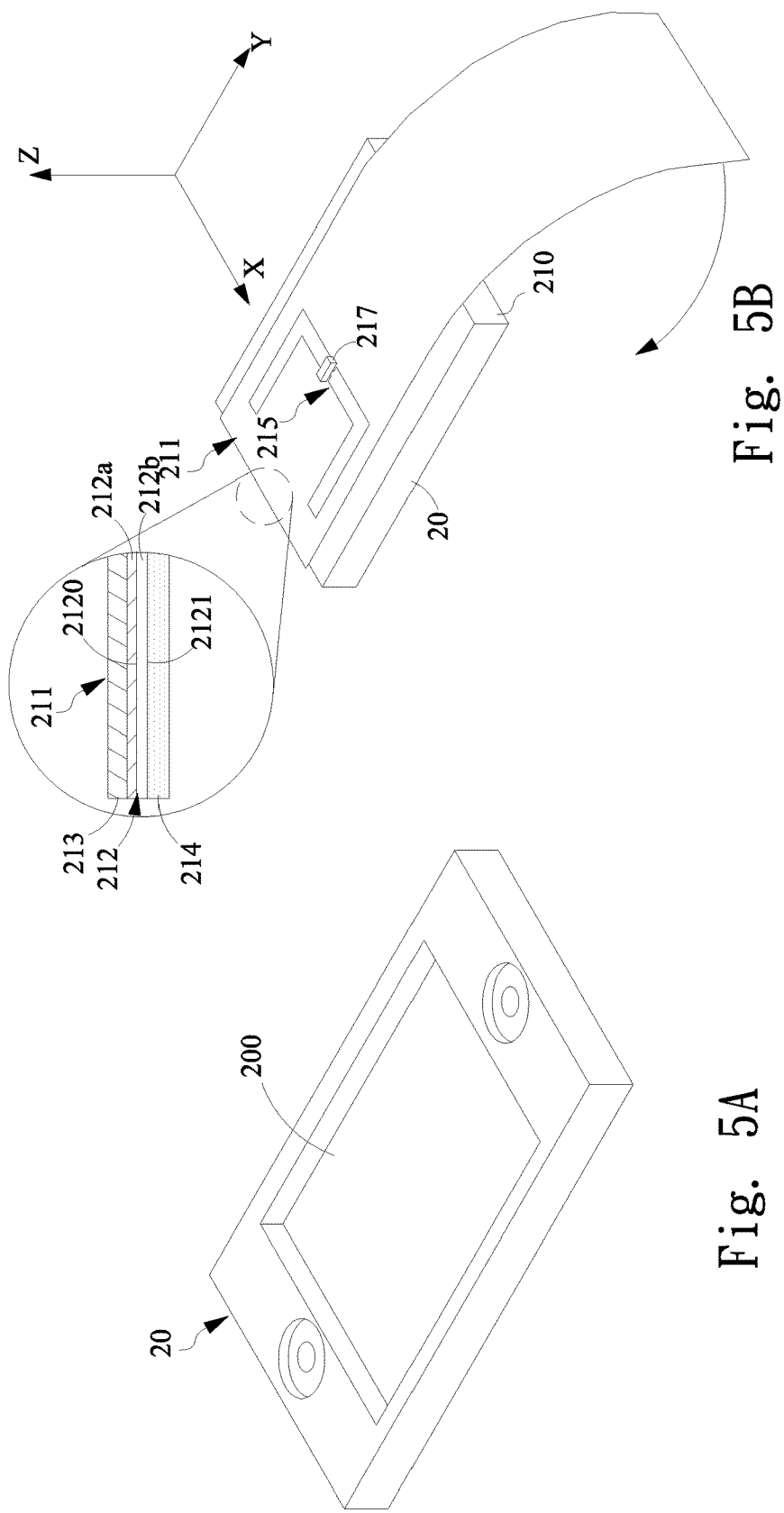

RFID DEVICE AND METHOD FOR MAKING THE SAME

This application claims the benefit of Taiwan Patent Application Serial No. 105142043, filed Dec. 19, 2016, the subject matter of which is incorporated herein by reference.

BACKGROUND OF INVENTION

1. Field of the Invention

The present invention related to an RFID technique, and more particularly, to an RFID device having an antenna module wrapped by housing by dual injection molding, and method of making the same.

2. Description of the Prior Art

Radio frequency identification (RFID) is a wireless communication technology that is an integration of wireless information process technology, read/write module, and RFID device. The RFID device comprises a chip circuit and antenna coil so that contactless reading and/or writing of data to the RFID device through RFID reader can be performed to acquired the information stored in the RFID device. The acquired information can be processed, utilized and applied in various kinds of electrical application such as door access control, and vehicle immobilizer system, for example.

In addition, US. Pub. No. 20140332597 also disclosed an RFID microchip embedded or encapsulated inside and an EM coil either embedded or encapsulated inside or wrapped around the periphery of the slug. The slug is formed by injection molding two plastic halves with a spacing therebetween for accepting the RFID microchip. The plastic halves are formed from weighted plastic including fillers such as copper, brass and/or tungsten to add extra weight to the plastic halves. The EM coil is placed on the same radius as the RFID antenna within the gaming chip or at a radius outside the RFID antenna to as to minimize interference between the RFID and EM signals by minimizing the metal in the EM field. For example, the EM coil may be wound within a groove around the outer periphery of the slug.

In the foregoing two conventional arts, the antenna is formed around the peripheral of the substrate and the antenna is made of copper. Since the copper antenna has to be formed by a plurality of turns so as to reach HF or UHF operation frequency, this will induce the higher manufacturing cost. On the other hand, in another conventional art, the antenna is formed on a printed circuit board (PCB). The PCB is then encapsulated inside the housing. In case of this kind of manufacturing process and structure, a waterproof gel and supersonic pressing process are necessary; therefore not only the manufacturing cost is increased, but also the waterproof effect is poor.

Accordingly, it is necessary to provide an RFID device and manufacturing method for solving the issues occurred in the conventional arts.

SUMMARY OF THE INVENTION

The present invention provides an RFID device and method of making the same, wherein a flexible RFID antenna film is stuck on a surface of a base material, or is wrapped on outer surface of the base material, the base material with the flexible RFID antenna film is arranged in a first housing formed by a first injection molding, and finally, a second housing is formed to hermetically coupled to the first housing by a second injection molding so that the base material having the flexible RFID antenna is encapsulated between the first housing and second housing whereby an RFID device with airtight and high-temperature resistant capabilities can be obtained.

The present invention provides an RFID device and method of making the same, in which the antenna film of the antenna module further comprises an antenna layer having an upper cover layer and lower cover layer, wherein the upper cover layer is a protection layer for preventing the antenna circuit from heat damage and deformation under high operation temperature during the second injection molding, and the lower cover layer is a adhesive layer having sticking gel for sticking on the surface of the base material for preventing the antenna layer from deformation caused by thrusting force generated by the high-speed flow of injected material during the second injection molding process.

In one embodiment, the present invention provides an RFID device comprises a first housing, an antenna module, and a second housing. The antenna module is arranged in the first housing, and the antenna module further comprises a base material, and an antenna film formed on a surface of the base material. The second housing is coupled to the first housing such that the antenna module is wrapped between the first and second housings.

In one embodiment, the antenna film further comprises an antenna layer, and a protection layer. The antenna layer is configured to have a first side and a second side, and the first antenna layer further comprises a base layer having a first surface on the first side and a second surface on the second side, and a metal layer formed on the first surface, the second surface or both first and second surfaces. The protection layer is formed on the first side of the antenna layer. The adhesive layer is formed on the second side of the antenna layer, wherein when the antenna film is arranged on a surface of the base material, the adhesive layer is arranged between the antenna layer and the surface of base material and is stuck on the surface of the base material.

In one embodiment, the antenna layer further comprises a metal layer having a pattern structure. The pattern structure comprises a hollow area having an RFID chip arranged therein. The RFID chip is coupled to the antenna layer.

In one embodiment, the present invention provides a method for forming an RFID device, comprising steps of: forming a first housing by a first injecting molding process, forming an antenna module by forming an antenna film on a surface of a base material, forming a transition module by arranging the antenna module in the first housing, and arranging the transition module in a mold and performing a second injecting molding process for forming a second housing coupled to the first housing whereby the antenna module is wrapped between the first and second housings.

In one embodiment, forming the antenna film further comprises steps of: providing an antenna layer having a first side and a second side, wherein the antenna layer further comprises a base layer having a first surface on the first side and a second surface on the second side, and a metal layer formed on the first surface, the second surface or both first and second surfaces, and forming a pattern structure on the antenna layer by etching the at least one metal layer. After that, it further comprises steps of forming a protection layer on the antenna layer at first side, forming an adhesive layer on the antenna layer at the second side, and forming a release layer on the adhesive layer. In one embodiment, the metal layer has a pattern structure comprising a hollow area with an RFID chip arranged therein. The RFID chip is coupled to the antenna layer.

In one embodiment, forming the antenna film on the base material further comprises steps of providing the antenna layer having the release layer, removing the release layer from the adhesive layer, and sticking the adhesive layer on the surface of the base material.

In one embodiment, the first and second housings are made of polymer material. Alternatively, the polymer material may contain glass fiber.

In one embodiment, the antenna film further wraps on a top surface and a bottom surface of the base material, wherein the top surface is opposite to the bottom surface.

All these objects achieved by the RFID sensing and recording device and method for making such kind device are described below.

BRIEF DESCRIPTION OF THE DRAWINGS

The present invention will now be specified with reference to its preferred embodiment illustrated in the drawings, in which:

FIGS. 5A to 5F respectively illustrate structural views with respect to each step of the flow shown in FIG. 4.

DESCRIPTION OF THE PREFERRED EMBODIMENT

The invention disclosed herein is directed to an RFID device and method for making the same. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1A:
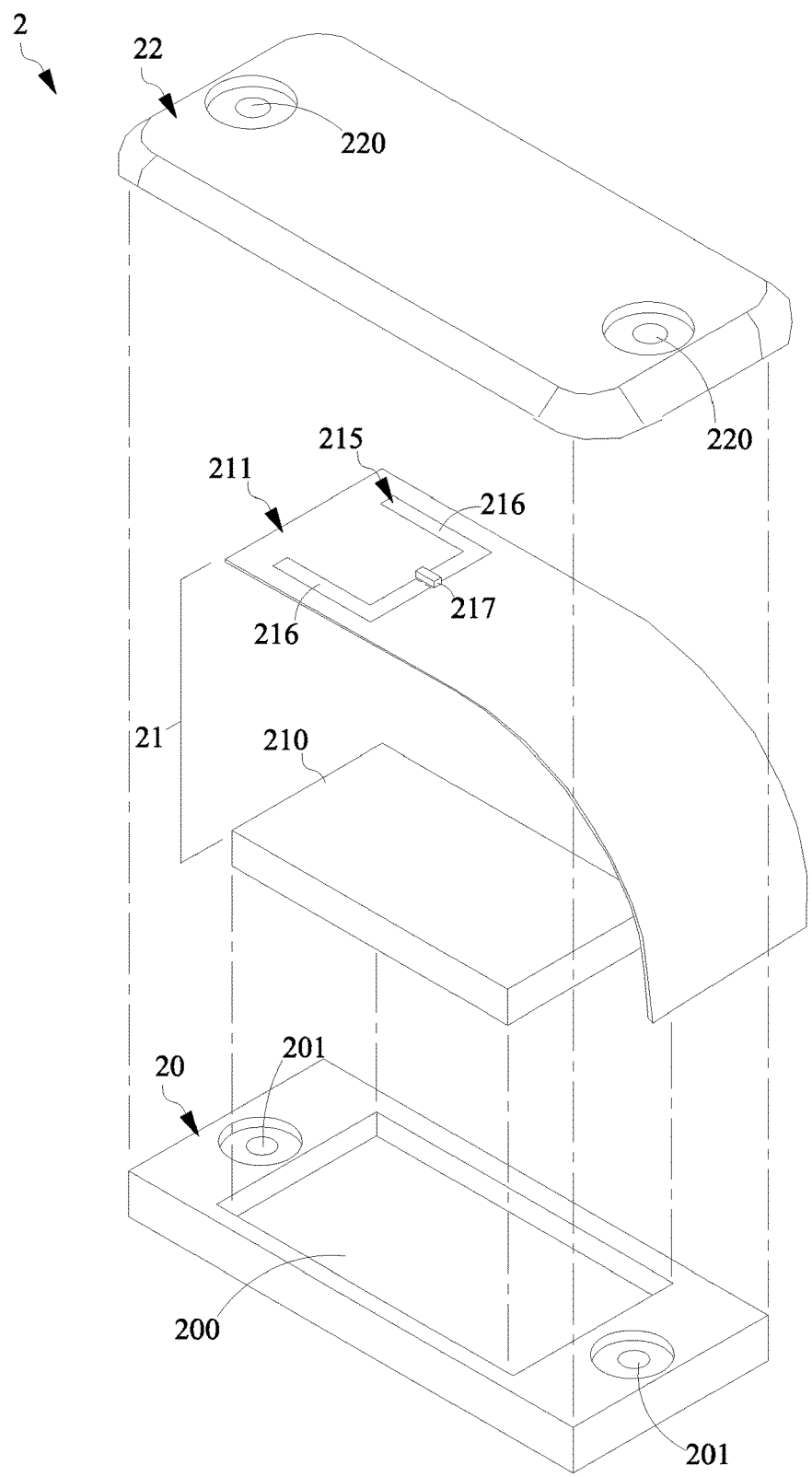
FIG. 1A illustrates an exploded view of RFID device according to one embodiment of the present invention.
Figure 1B:
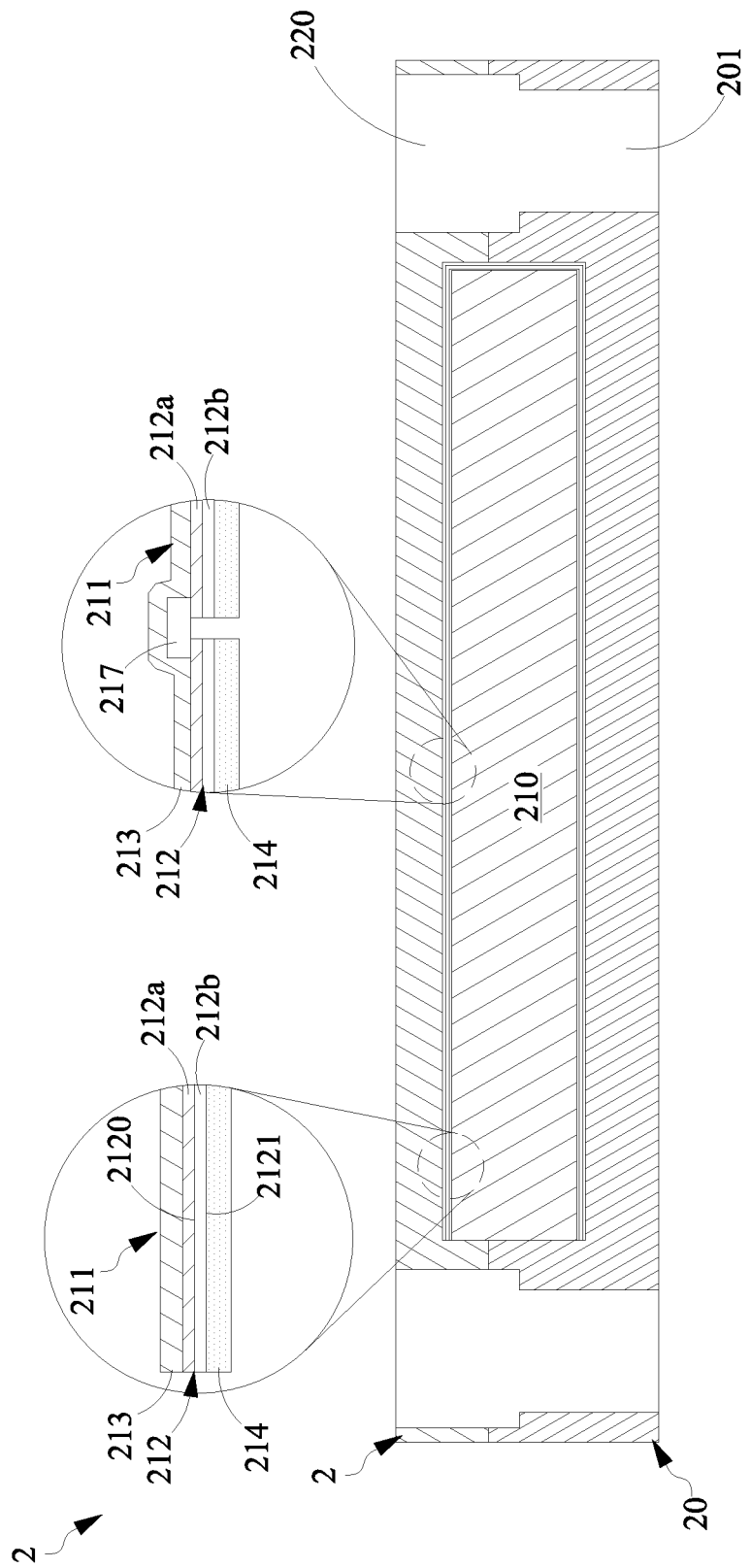
FIG. 1B illustrates a cross-sectional view of the RFID device according to one embodiment of the present invention.

Please refer to FIGS. 1A and 1B, wherein FIG. 1A illustrates an exploded view of RFID device according to one embodiment of the present invention, and FIG. 1B illustrates a cross-sectional view of the RFID device. In the present embodiment, the RFID device 2 comprises a first housing 20, an antenna module 21, and a second housing 22. The first housing 20 has an accommodating structure 200 formed therein. The antenna module 21 is arranged in the accommodating structure 200. The second housing 22 is hermetically coupled to the first housing 20 such that the antenna module 21 is encapsulated between the first housing 20 and second housing 22. The space inside the encapsulation formed by first and second housings 20 and 22 is airtight to the exterior.

In one embodiment, the two opposite ends of first housing 20 respectively comprise first fixing holes 201 while two opposite ends of the second housing 22 respectively comprise second fixing holes 220 respectively corresponding to the two first fixing holes 201. The first fixing hole 201 and corresponding second fixing hole 220 are coupled to each other so as to form a through hole for allowing a fixing element passing therethrough thereby enhancing combination effect of first and second housings 20 and 22. It is noted that the first and second fixing holes 201 and 220 are not essential within the scope of the present invention. Existence of such features is determined according to the need of design and is not a limitation of the present invention.

In one embodiment, the first housing 20 is formed by injection molding process. The material for forming the first housing 20 is polymer material such as polyamide (PA), i.e., a macromolecule with repeating units linked by amide bonds. Examples of polyamide can be, but should not be limited to, PA6, PA66, PA10T. Alternatively, the polymer material can may contain glass fiber for reducing the shrinkage after the formation of the first housing 20. In addition, when the glass fiber is contained in the polymer material, not only can the mechanical strength such as scratch resistance and hardness of the housing be increased, but also the bending deformation is reduced. Likewise, in one embodiment, the material of second housing 22 is the same as the material of the first housing 20. In order to make the first housing 20 hermetically coupled to the second housing 22, in one embodiment, a second injection molding process is utilized to form the second housing 22 integrally formed on the first housing 20 having the antenna module 21 arranged therein. By means of the dual injection molding process, i.e. first and second injection molding processes, the RFID device 2 can have airtight and highly heat resistant capabilities.

In one embodiment, the antenna module 21 comprises a base material 210 and RFID antenna film 211. The antenna film 211 is formed on at least one surface of the base material 210. In one embodiment, the antenna film 211 comprises an antenna layer 212, a protection layer 213 and an adhesive layer 214. The antenna layer 212 has a first side, e.g. top side shown in the FIG. 1B, and a second side, e.g. bottom side shown in the FIG. 1B. In the present embodiment shown in FIG. 1B, the antenna layer 212 comprises a base layer 212b and a metal layer 212a, wherein the base layer 212b has a first surface 2120 on the first side and the second surface 2121 on the second side. The metal layer 212a can be formed on the first surface 2120, the second surface 2121 or both first and second surfaces 2120 and 2121. In the present embodiment, the metal layer 212a is formed on the first surface 2120. The metal layer 212a defines a pattern structure 215.

In one embodiment, the pattern structure 215 comprises a hollow area 216, and an RFID chip 217 is arranged in or above the hollow area. The RFID chip 217 is coupled to the antenna layer 212. In the present invention, the hollow area 216 is L-shaped hollow area. It is noted that the shape of the hollow area 216 is designed according to the need of utilization so it is not limited to the shape shown in the drawings of the present invention. In addition, the metal layer 212a can be, but should not be limited to, an aluminum foil. In case of aluminum foil, the pattern structure 215 can be formed by aluminum etching process. The pattern of the pattern structure 215 is etched according to the actual need, and it is not limited to the embodiments shown in the present invention. Alternatively, the metal layer 212a can also be copper material, or other metal material that can be utilized to form the antenna circuit.

Since the second injection molding process is necessary to be utilized to form the second housing 22 hermetically coupled to the first housing 20 accommodating the antenna module 21 such that the antenna module 21 is encapsulated between first housing 20 and second housing 21, there has higher possibility that the antenna module 21 would be damaged by the melted material having higher temperature during the encapsulating process. In order to solve this problem, a protection layer 213 is adapted to be formed on the first surface 2120. In the present invention, the protection layer 213 is formed on the top surface of metal layer 212a. In addition to being formed on the metal layer 212a, the protection layer 213 is also formed on surface of RFID chip 217. Moreover, the second side of the antenna layer comprises the adhesive layer 214. The adhesive layer 214 is utilized to make the antenna layer 212 be stuck on surface of the base material 210. In the present invention, the protection layer 213 can be, but should not be limited to, polyethylene terephthalate (PET).

Figure 1C:
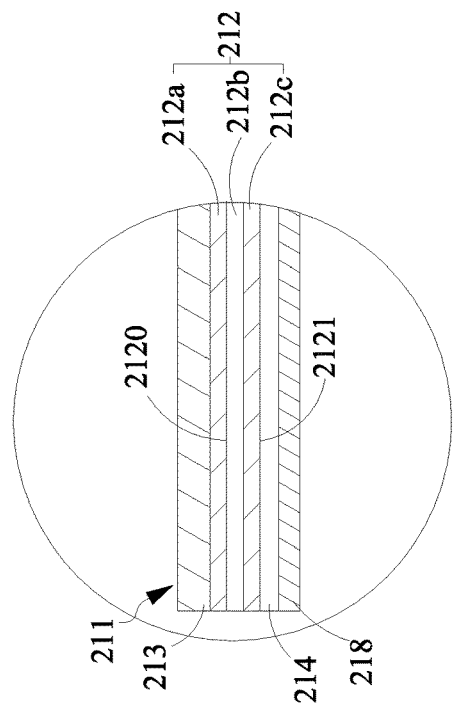
FIG. 1C illustrates antenna film according to another embodiment of the present invention.

The protection layer 213 has capability of preventing the antenna circuit from being damaged and deformed due to the high temperature injection molding process. In addition, the adhesive layer 214 comprises adhesive gel so that the antenna layer 212 can be firmly stuck on the surface of the base material 210 whereby when the melted material with high speed and high temperature flowing into the mold cavity having the antenna module 21 and first housing 20, since the antenna layer 212 is firmly stuck on the base material 210, the antenna layer 212 will not be damaged or deformed by the melted material thrust on the antenna layer 212. Please refer to FIG. 1C, which illustrates antenna film according to another embodiment of the present invention. In the present invention, different from the metal layer 212a formed on first surface 2120 of base layer 212b, there has two metal layers 212a and 212c respectively formed on the first surface 2120 and second surface 2121 of the base layer 212b, and the adhesive layer 214 is formed on another surface of the metal layer 212c. The feature of metal layer 212a and 212c is the same as the previously described metal layer 212a, so it will not be further described hereinafter.

Figure 2:
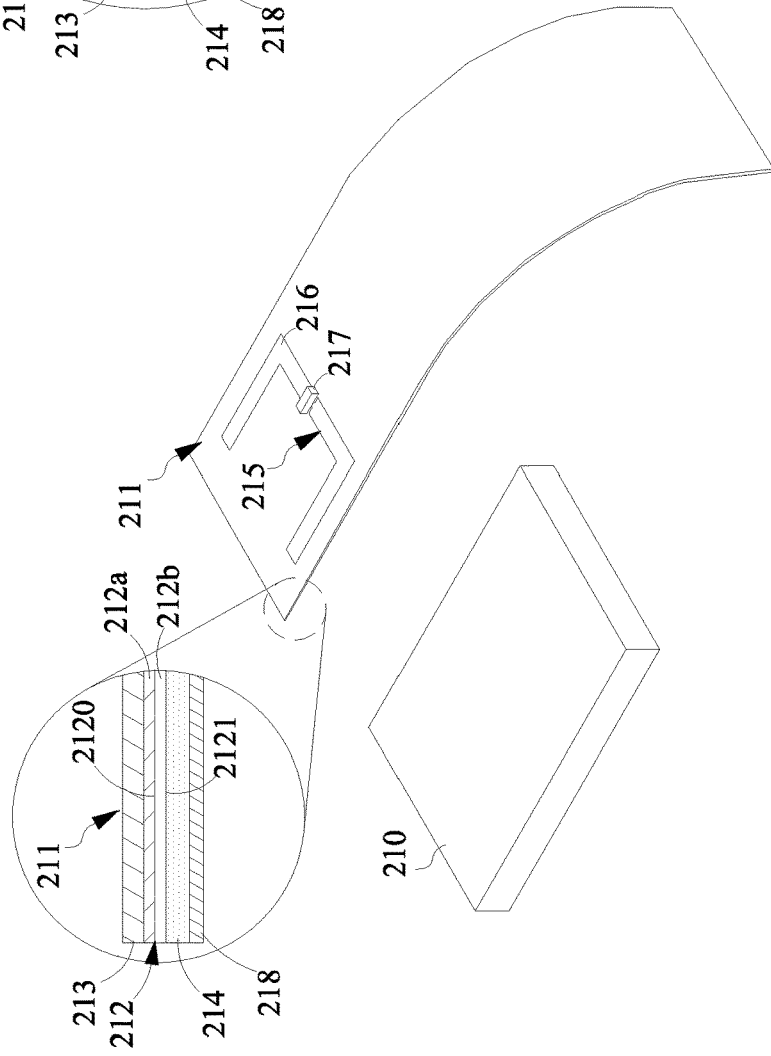
FIG. 2 illustrates the antenna film and base material according to one embodiment of the present invention.

Please refer to FIG. 2, which illustrates the antenna film and base material according to one embodiment of the present invention. In the present embodiment, in addition to the antenna layer 212, protection layer 213 and adhesive layer 214 of the antenna film 211, the antenna film 211 further comprises a release layer 218. The material for forming the release layer 218 can be, but should not be limited to, paper, cloth, or plastic material. In a first condition, the release paper 218 is releasably stuck on the adhesive layer 214. In a second condition when the antenna film 211 is used to stick on the base material 210, the release paper 218 is removed to expose the adhesive layer 214. The antenna layer 212 is stuck on the base material 210 by the adhesive layer 214. In the present embodiment, the antenna film 211 is a band-type structure for fitting the rectangular shape of the base material 210.

Figure 3B:
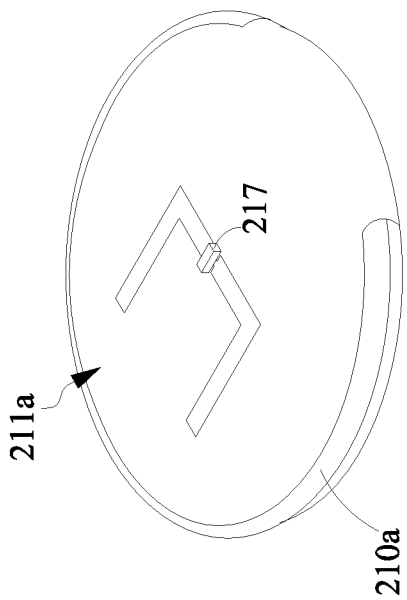
FIGS. 3A and 3B illustrate antenna module according to another embodiment of the present invention.
Figure 3A:
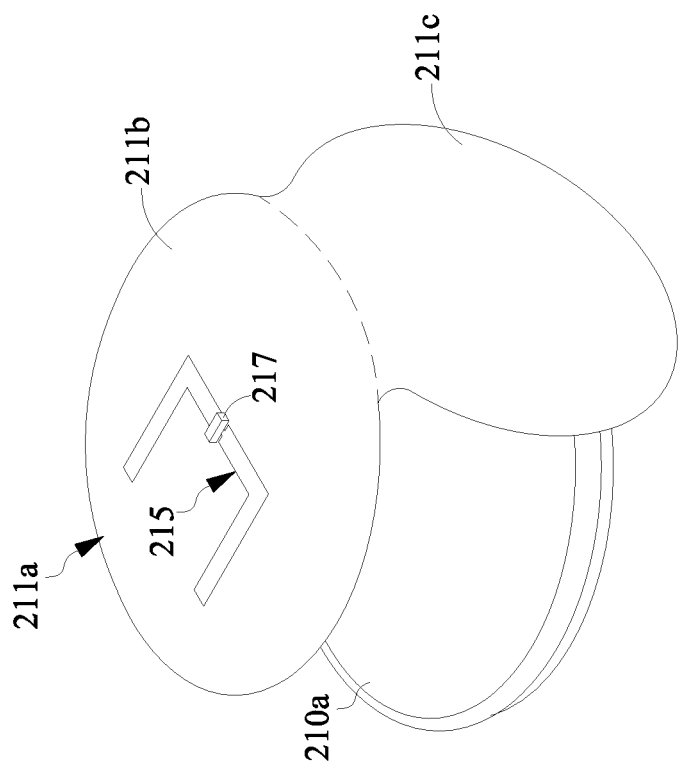
Figure 3D:
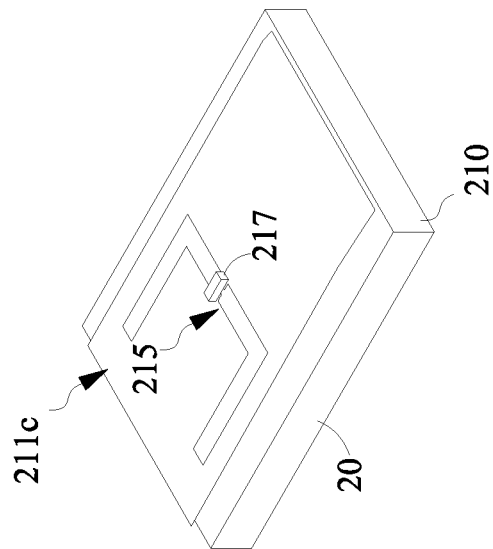
FIGS. 3C and 3D respectively illustrate antenna modules having another kind of antenna film stuck thereon according to a further embodiment of the present invention.
Figure 3C:
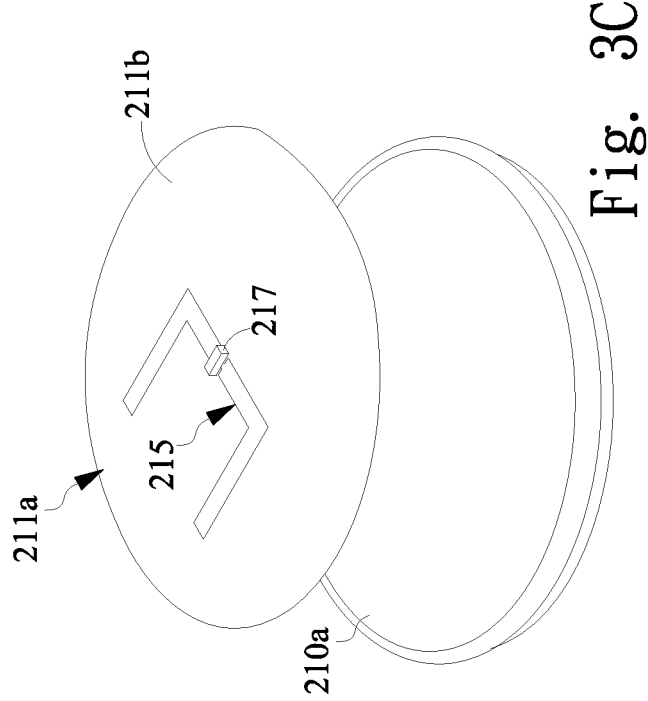

It is noted that the shape of the base material 210 is not limited to the embodiment shown in FIG. 2. Alternatively, please refer to the FIGS. 3A and 3B, the base material 210 is a block having circular shape and the antenna film 211a is a structure having two connected first and second antenna films 212b and 212c, wherein the first antenna film 212b is stuck on the top surface of the base material 210a while the second antenna film 212c is stuck on the bottom surface of the base material 210a. Moreover, please refer to FIGS. 3C and 3D, which respectively illustrate antenna modules having another kind of antenna film stuck thereon according to a further embodiment of the present invention. Basically, the embodiment shown in FIGS. 3C and 3D are similar to the embodiments shown in FIGS. 2 and 3A, the different part is that the antenna film 211b and 211d is stuck on a single surface, e.g., top surface or bottom surface of the base material 210 or 210a. The surfaces of the base material 210 are not wrapped by the antenna film 211 shown in FIGS. 3C and 3D, while the surfaces of the base material, e.g. top surface, bottom surface, and at least one edge surface, are wrapped by the antenna film shown in FIGS. 2, and 3A.

Figure 4:
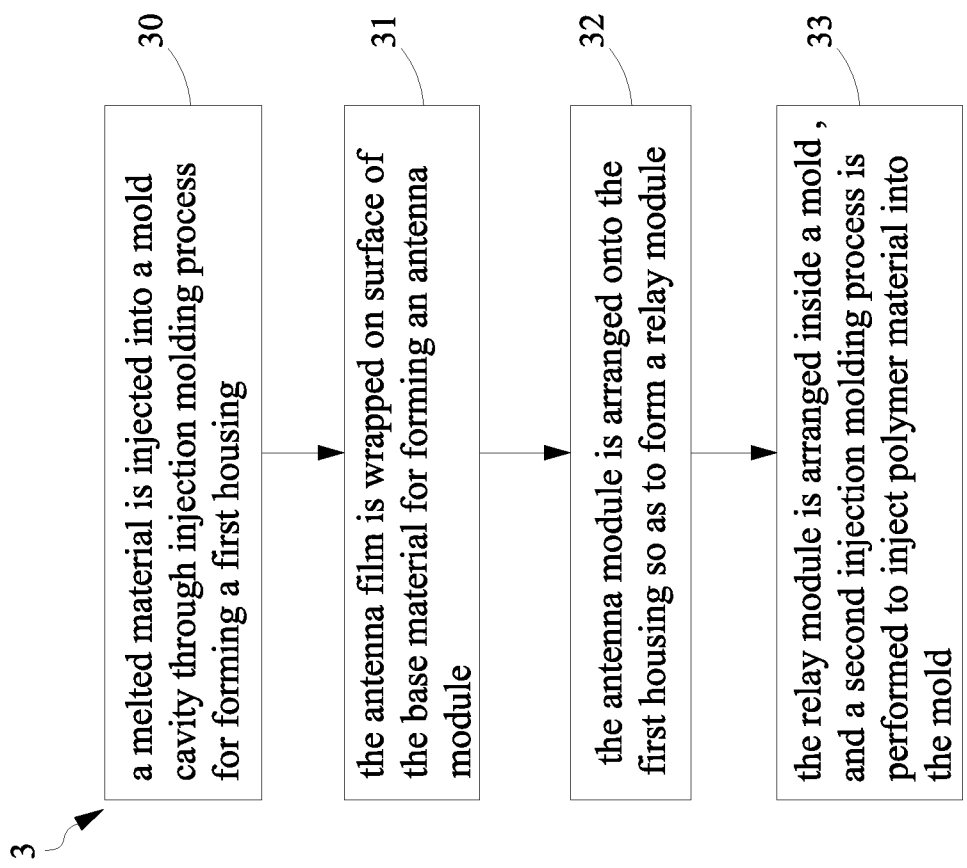
FIG. 4 illustrates a flow chart of method for making RFID device according to one embodiment of the present invention.

Please refer to FIG. 4, which illustrates a flow chart of method for making RFID device according to one embodiment of the present invention. In the present embodiment, the flow comprises the following steps. At step 30, a melted material is injected into a mold cavity by an injection molding process for forming a first housing 20 having accommodating structure 200 shown in FIG. 5A. The injection molding process is well known in the art, and will not be further described hereinafter. The melted material is a polymer material which can be, but should not be limited to, polyamide such as, PA6, PA66, and PA10T. Alternatively, the polymer material may contain glass fiber for reducing shrinkage after the formation of the first housing 20.

Figure 5C:
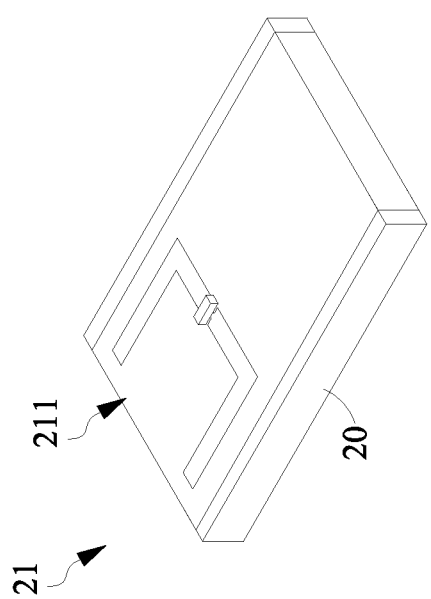

Next, as shown in FIG. 5B, a step 31 is performed. In step 31, the antenna film 211 is wrapped on a surface of the base material 210 so as to form an antenna module 21 shown in FIG. 5C. There has no limitation on the shape of the base material 210. The shape of the base material 210 is determined according to the user's need. In the present embodiment, the base material is a rectangular block. In the step 31, the antenna film 211 is the same as the structure shown in the FIG. 2.

Next, one embodiment for forming the antenna film 211 is further explained in detail. In the present embodiment, the step of forming the antenna film 211 comprises step of providing an antenna layer 212 having a first side and a second side opposite to the first side, wherein the antenna layer 212 comprises a base layer 212b having a first surface 2120 at the first side and a second surface 2121 at the second side, and a metal layer 212a formed on the first surface 2120, the second surface 2121 or both first and second surfaces 2120 and 2121. In the present embodiment, the metal layer 212a is formed on the first surface 2120. After that, an etching process is performed for forming a pattern structure on the antenna layer 212. In the present embodiment, a hollow structure is formed on the antenna layer 212, which is previously described and will not be described in detail hereinafter. Since the metal layer 211a is aluminum in the present embodiment, the etching process is an aluminum etching so that an antenna made of aluminum foil is generated. Alternatively, metal layer 212a having pattern structure can be formed on the base layer 212b by a screen printing process.

Next, a protection layer 213 is formed on a top surface of the metal layer 212a. After that, an adhesive layer 214 is formed on a bottom surface of the base layer 212b and a release layer 218 is releasably formed on the adhesive layer 214. In addition, in order to fit the shape of the base material 210, the antenna film 211 is a band structure. When it comes to stick the antenna film 211 on the surface of the base material 210, the release layer 218 is removed from the antenna film 211 such that the adhesive layer 214 is exposed. After that, the adhesive layer 214 is stuck on the surface of the base material 210. In one embodiment, the antenna film 211 is stuck on the top surface and bottom surface of the base material 210. Alternatively, the antenna film 211 is wrapped on the top surface, bottom surface and two opposite edge surfaces having normal direction Y extending between the top surface and bottom surface. It is noted that in addition to wrapping round the surfaces of the base material 210, the antenna film 211 can also be stuck on a single surface of the base material 210 using the way shown in FIGS. 3C and 3D.

Figure 5D:
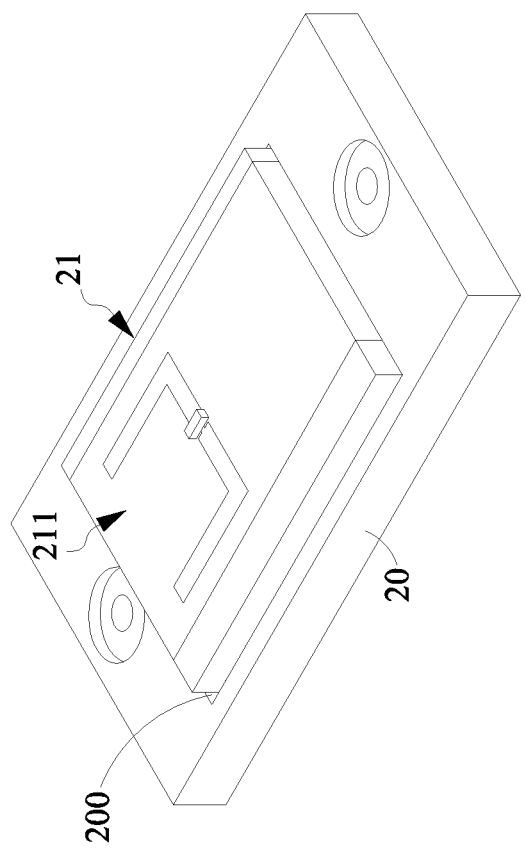
Figure 5F:
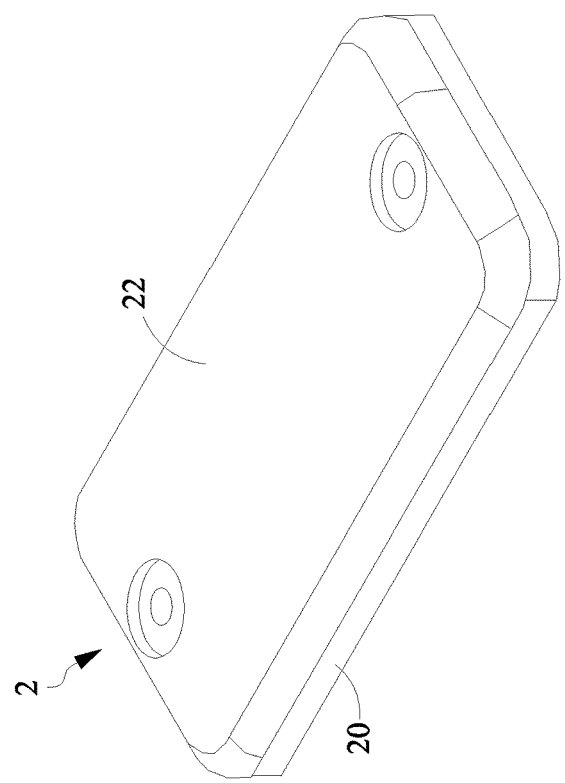
Figure 5E:
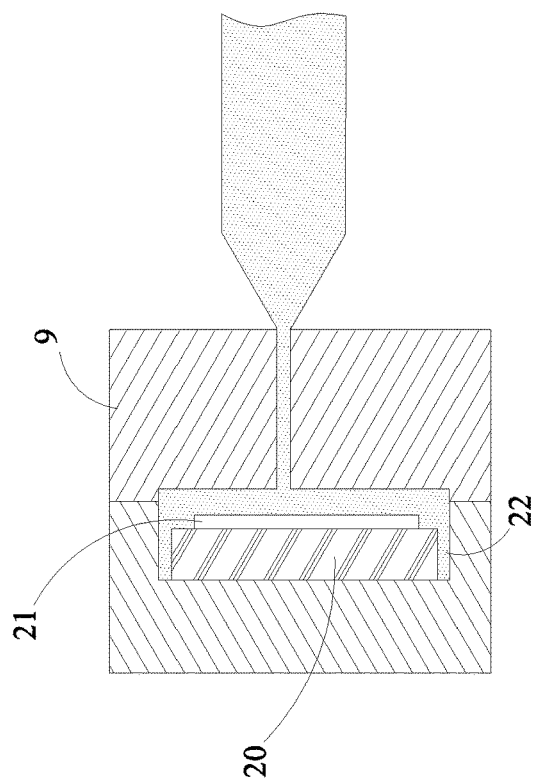

Please refer to FIG. 4, after step 31 being performed; a step 32 is processed, wherein the antenna module 21 is arranged onto the first housing 20 so as to form a relay module shown in FIG. 5D. In the present embodiment, the antenna module 21 is arranged in an accommodating structure 200 formed on the first housing 20. Finally, a step 33 is performed. In the step 33, please refer to FIG. 5E, the relay module having the first housing 20 and antenna module 21 is arranged inside a mold 9, and a second injection molding process is performed to inject polymer material into the mold 9 whereby a second housing 22 is formed to cover the first antenna module 21 and is coupled to the first housing 20. In the present embodiment, the antenna module 21 is encapsulated between the first housing 20 and second housing 22, which is illustrated as FIG. 5F. It is noted that the polymer material in step 33 can be, but should not be limited to, polyamide, a macromolecule with repeating units linked by amide bonds such as PA6, PA66, PA10T, for example. Alternatively, in one embodiment, the polymer material may contain glass fiber for reducing shrinkage rate of the polymer material after injection molding formation.

While the present invention has been particularly shown and described with reference to a preferred embodiment, it will be understood by those skilled in the art that various changes in form and detail may be without departing from the spirit and scope of the present invention.

What is claimed is:

1. An RFID device comprising:
    a first housing formed by a first injection molding process;
    an antenna module, arranged in the first housing, the antenna module comprising a base material, and an antenna film formed on a surface of the base material; and
    a second housing formed to couple to the first housing by a second injection molding process, wherein the antenna module is encapsulated between the first and second housings, wherein the antenna film comprises:
        an antenna layer, configured to have a first side and a second side, the antenna layer comprising a base layer having a first surface on the first side and a second surface on the second side, and a metal layer formed on the first surface, the second surface or both first and second surfaces of the base layer;
        an RFID chip coupled to the antenna layer;
        a protection layer, formed on the first side of the antenna layer and covering the RFID chip; and
        an adhesive layer, formed on the second side of the antenna layer, wherein when the antenna film is arranged on a surface of the base material, the adhesive layer is arranged between the antenna layer and the surface of base material and is stuck on the surface of the base material.

2. The RFID device of claim 1, wherein the metal layer defines a pattern structure having a hollow area, wherein the RFID chip is arranged in or above the hollow area.

3. The RFID device of claim 1, wherein the antenna film is formed of metal.

4. The RFID device of claim 1, wherein the first and second housings are made of polymer materials.

5. The RFID device of claim 4, wherein the polymer materials contain glass fiber.

6. The RFID device of claim 1, wherein the surface of the base material comprises a top surface, a bottom surface opposite to the top surface, and two opposite edge surfaces extending between the top surface and bottom surface, and the antenna film wraps on at least one of the top surface and the bottom surface and on at least one of the two opposite edge surfaces.

7. A method for forming an RFID device, comprising steps of:
    forming a first housing by a first injecting molding process;
    forming an antenna film on a surface of a base material to form an antenna module, including:
        providing an antenna layer having a first side and a second side, wherein the antenna layer comprises a base layer having a first surface on the first side and a second surface on the second side, and a metal layer having a pattern structure formed on the first surface, the second surface or both first and second surfaces of the base layer,
        forming a protection layer on the antenna layer on the first side,
        forming an adhesive layer on the antenna layer on the second side, and
        placing the adhesive layer on a surface of a base material;
    arranging the antenna module in the first housing; and
    arranging the first housing with the antenna module in a mold and performing a second injecting molding process to form a second housing coupled to the first housing, whereby the antenna module is encapsulated between the first and second housings.

8. The method of claim 7, further comprising, before forming the protection layer, arranging an RFID chip on the pattern structure and coupling the RFID chip to the antenna layer.

9. The method of claim 8, wherein the pattern structure has a hollow area and the RFID chip is arranged in or above the hollow area.

10. The method of claim 7, wherein the step of forming the antenna film on the surface of the base material further comprises: forming a release layer on the adhesive layer.

11. The method of claim 10, wherein the step of forming the antenna film on the surface of the base material further comprises steps of:
    obtaining the antenna layer having the release layer;
    removing the release layer from the adhesive layer; and
    sticking the adhesive layer on the surface of the base material.

12. The method of claim 7, wherein the first and second housings are made of a polymer material.

13. The method of claim 12, wherein the polymer material contains glass fiber.

14. The method of claim 7, wherein the surface of the base material comprises a top surface, a bottom surface opposite to the top surface, and two opposite edge surfaces extending between the top surface and bottom surface, and the antenna film wraps on the top surface, the bottom surface and at least one of the two opposite edge surfaces.

* * * * *